US011953160B2

(12) United States Patent
Bartlok et al.

(10) Patent No.: US 11,953,160 B2
(45) Date of Patent: Apr. 9, 2024

(54) LIQUID HYDROGEN STORAGE TANK

(71) Applicant: MAGNA STEYR Fahrzeugtechnik AG & Co KG, Graz (AT)

(72) Inventors: Guido Bartlok, Graz (AT); Daniel Kupelwieser, Graz (AT)

(73) Assignee: MAGNA STEYR Fahrzeugtechnik Gmbh & Co KG, Graz (AT)

( * ) Notice: Subject to any disclaimer, the term of this patent is extended or adjusted under 35 U.S.C. 154(b) by 307 days.

(21) Appl. No.: 17/676,631

(22) Filed: Feb. 21, 2022

(65) Prior Publication Data

US 2022/0307651 A1 Sep. 29, 2022

(30) Foreign Application Priority Data

Mar. 24, 2021 (DE) ........................ 102021202900.0

(51) Int. Cl.
*F17C 7/04* (2006.01)
*F17C 13/04* (2006.01)

(52) U.S. Cl.
CPC ................ *F17C 7/04* (2013.01); *F17C 13/04* (2013.01); *F17C 2205/0323* (2013.01); *F17C 2221/012* (2013.01); *F17C 2223/0161* (2013.01); *F17C 2227/0114* (2013.01); *F17C 2250/0439* (2013.01); *F17C 2250/0636* (2013.01); *F17C 2265/025* (2013.01); *F17C 2265/031* (2013.01)

(58) Field of Classification Search
CPC .... F17C 13/04; F17C 7/04; F17C 2205/0323; F17C 2221/012; F17C 2223/0161; F17C 2227/0114; F17C 2250/0439; F17C 2250/0636; F17C 2265/025; F17C 2265/031
See application file for complete search history.

(56) References Cited

U.S. PATENT DOCUMENTS 4,128,627 A * 12/1978 Dyer .................... B01J 31/1895 423/584
2003/0104261 A1* 6/2003 Schnitzer .......... H01M 8/04395 429/444

(Continued)

FOREIGN PATENT DOCUMENTS

| | | | |
|---|---|---|---|
| DE | 102 02 171 | A1 | 7/2003 |
| DE | 10 2016 209 170 | A1 | 11/2017 |
| JP | 2002 106 798 | A | 4/2002 |

*Primary Examiner* — Henry T Crenshaw
(74) *Attorney, Agent, or Firm* — Jordan IP Law, LLC; Todd A. Vaughn

(57) ABSTRACT

A liquid hydrogen reservoir and a method for operating a liquid hydrogen reservoir. The liquid hydrogen reservoir includes a cryostatic container operable to hold liquid hydrogen; a discharge line operable to discharge gaseous hydrogen in the cryostatic container; a boil-off management system (BMS), a return line, and a boil-off valve (BOV). The BMS that includes a mixing chamber operable to mix the gaseous hydrogen with ambient air, a catalyst arranged downstream of the mixing chamber and operable for a catalytic conversion of the gaseous hydrogen with the ambient air, and an exhaust gas line arranged downstream of the catalyst and operable to discharge the gas stream to the environment. The return line is operable to connect the exhaust gas line to the mixing chamber to facilitate a return flow of at least a partial stream of the exhaust gas line into the mixing chamber.

20 Claims, 1 Drawing Sheet

(56) References Cited

U.S. PATENT DOCUMENTS

| | | | | |
|---|---|---|---|---|
| 2017/0341769 | A1* | 11/2017 | Haberbusch | B64F 1/28 |
| 2020/0096157 | A1* | 3/2020 | Kim | F17C 13/002 |
| 2020/0224825 | A1* | 7/2020 | Winand | F17C 13/084 |
| 2022/0204337 | A1* | 6/2022 | Stager | F17D 1/02 |

* cited by examiner

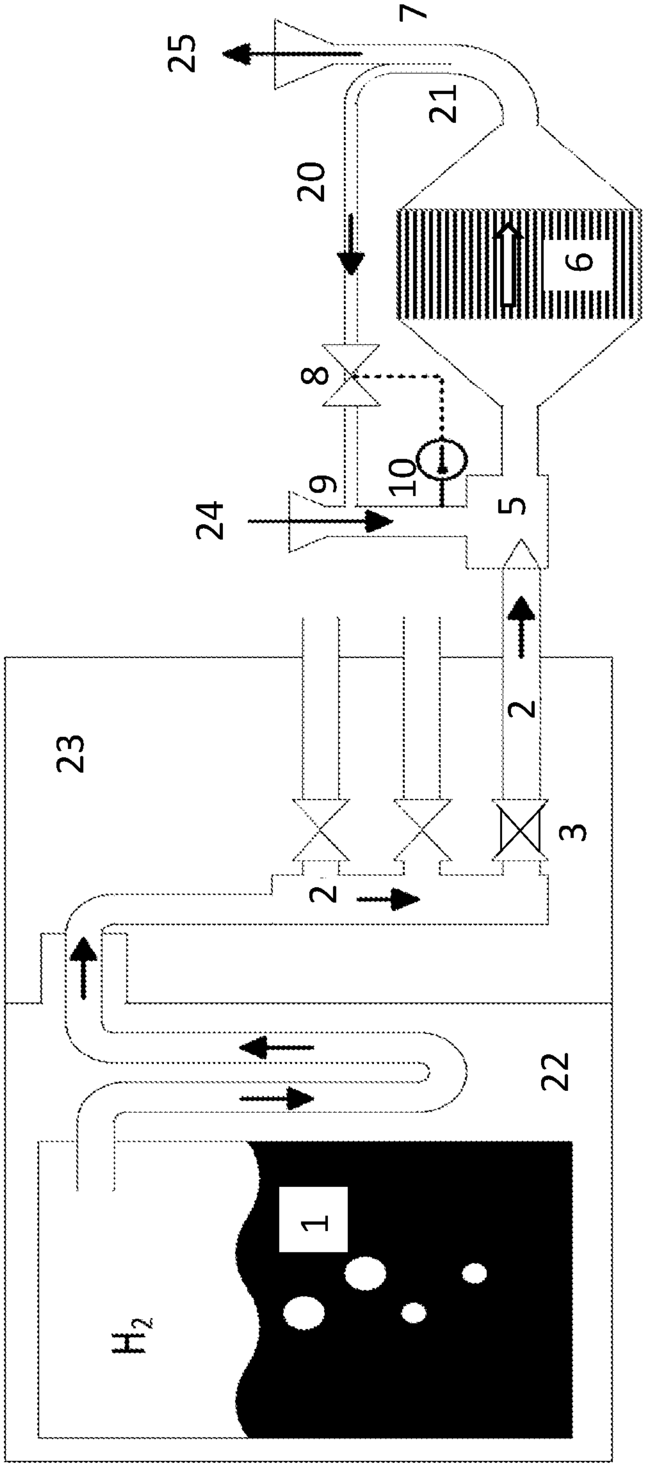
25
7
21
20
6
8
9
10
5
24
2
23
3
2
22
1
H2

LIQUID HYDROGEN STORAGE TANK

CROSS-REFERENCE TO RELATED APPLICATIONS

The present application claims priority under 35 U.S.C. § 119 to German Patent Publication No. DE 102021202900.0 (filed on Mar. 24, 2021), which is hereby incorporated by reference in its complete entirety.

TECHNICAL FIELD

Embodiments relate to a liquid hydrogen reservoir comprising a cryostatic container for holding liquid hydrogen, and to a method for operating such a liquid hydrogen reservoir.

BACKGROUND

It is known to use cryostatic containers for storing liquid hydrogen, in particular for carrying liquid hydrogen in hydrogen-powered motor vehicles, for example, in fuel cell vehicles.

As a result of the unavoidable heat input into the cryostatic container of a fuel cell vehicle powered by liquid hydrogen, hydrogen is continuously evaporated. Should a correspondingly large amount not be withdrawn for the hydrogen consumer, the pressure in the tank increases.

In order to maintain the pressure in the tank below a specific threshold value, a valve can open in such liquid hydrogen reservoirs, namely, a so-called "boil-off valve" (BOV), whereby gaseous hydrogen is discharged into the environment.

In order to eliminate any hazard, for example an explosion, due to excessively high hydrogen concentrations in the environment, the discharged gas can be catalytically converted with the oxygen in the surrounding air and thus, reacts to form water vapour. This system is referred to as the boil-off management system (BMS). As soon as the BOV opens, gaseous hydrogen under high pressure flows from the cryogenic tank. It is then blown through a nozzle into a mixing chamber, in which incoming air is mixed with the hydrogen and transported in the direction towards a catalyst. Finally, the exothermic catalytic conversion of the blown-off hydrogen takes place in the catalyst.

German Patent Publication No. DE 10 2016 209 170 A1, for example, discloses a method for checking the functionality of a catalytic converter for converting a fuel, in particular hydrogen, in a vehicle, wherein the catalytic converter is fluidically connected via a connecting line to a pressure vessel for storing the fuel, wherein a relief valve is arranged in the connecting line and is configured to allow fuel to pass to the catalytic converter when the pressure of the fuel in the pressure vessel exceeds a pressure value.

Since the outflowing hydrogen (the boil-off gas) is very cold (e.g., boiling point about 20 K) and low pressure prevails in the mixing chamber, there is a risk under unfavourable environmental conditions, especially at an ambient temperature just above the freezing point of water and at high atmospheric humidity, of "carburetor icing," i.e., the formation of ice in the mixing chamber due to the water vapour contained in the surrounding air, or of blocking of the gas feed to the catalyst. This would lead to loading of the catalyst with pure hydrogen and thus, to failure of the system.

SUMMARY

One or more embodiments are to enhance liquid hydrogen reservoirs in the above-noted respect, and in particular, to provide a liquid hydrogen reservoir which can be operated reliably, even at low ambient temperatures. In particular, the formation of ice in a BMS of the liquid hydrogen reservoir is efficiently prevented. In addition, a method for operating such a liquid hydrogen reservoir is provided in which the formation of ice in a BMS of the liquid hydrogen reservoir is efficiently prevented.

In accordance with one or more embodiments, a liquid hydrogen reservoir comprises: a cryostatic container for holding the liquid hydrogen; a discharge line for discharging gaseous hydrogen; a boil-off valve in the discharge line for selectively opening and closing a flow connection of the discharge line to a BMS that includes: (i) a mixing chamber for mixing the gaseous hydrogen with air, (ii) a catalyst arranged downstream of the mixing chamber for the catalytic conversion of the gaseous hydrogen with the air, (iii) an exhaust gas line arranged downstream of the catalyst for discharging the gas stream to the environment, and (iv) a return line operable to connect the exhaust gas line to the mixing chamber so that at least a partial stream of the exhaust gas line can be fed back into the mixing chamber.

In accordance with one or more embodiments, a liquid hydrogen reservoir comprises a BMS having a return line operable to connect an exhaust gas line operable to discharge the water vapour-air mixture to the environment, to a mixing chamber operable to mix hydrogen with air for the catalyst of the BMS. In that way, at least a partial stream of the exhaust gas line is fed back into the mixing chamber.

In accordance with one or more embodiments, a portion of the warm exhaust gas of the BMS of a vehicle powered by liquid hydrogen can therefore, particularly at ambient temperatures close to 0° C. and preferably via Venturi suction, be fed back into the mixing chamber of the BMS in order to warm the mixing chamber internally, and thus, avoid the formation of ice.

In accordance with one or more embodiments, the return line does not have to open directly into the mixing chamber for this purpose. For example, the return line can open into the mixing chamber via additional, other lines, or components such as valves could be arranged upstream of the mixing chamber.

In accordance with one or more embodiments, the air which is taken into the mixing chamber of the BMS can thus be warmed passively, i.e., without the need for electric current, for example. The waste heat of the BMS catalyst is used for this purpose. The exhaust gas stream of the BMS is not severely impeded, in order to avoid an excessively high counterpressure, and thus, impairment of the system as a whole. Measures can preferably also be taken so that the temperature in the mixing chamber does not become too high, in order reliably to prevent ignition in the region of the inflow nozzle.

In accordance with one or more embodiments, the boil-off valve in the discharge line for selectively opening and closing a flow connection of the discharge line to a BMS is configured to open and close the flow connection automatically, i.e., in a controlled and/or regulated manner. In order to protect the tank, the valve is usually controlled in dependence on the pressure in the tank.

In accordance with one or more embodiments, a temperature-controlled valve is arranged in the return line and operable to open and close the return line in response to a detected temperature value. As used herein, the expression "temperature-controlled valve" is to include both thermostatic valves, i.e., valves which have a temperature-dependent switching function arranged at the valve, and conventional valves which do not have a temperature-dependent switching function arranged directly at the valve but nevertheless can be opened or closed via a temperature value. The valve can be actuated electrically or mechanically, for example.

In accordance with one or more embodiments, the temperature-controlled valve is operable to open or close in response to a detected temperature value at an air supply line upstream of the mixing chamber and/or in the mixing chamber. For this purpose, the temperature-controlled valve can be equipped with a temperature probe or temperature sensor at the air supply line upstream of the mixing chamber and/or in the mixing chamber. The temperature probe or temperature sensor can also be in the form of separate components, i.e., they do not necessarily have to form a structural unit with the valve. In this case, the valve is usually controlled electrically via a control device in response to a detected measured temperature value.

In accordance with one or more embodiments, the return line is operable to connect the exhaust gas line to an air supply line upstream of the mixing chamber, so that the partial stream of the exhaust gas line can be fed back into the mixing chamber through the air supply line.

In accordance with one or more embodiments, the air is fed into the mixing chamber and/or the partial stream of the exhaust gas line is fed into the mixing chamber via the Venturi principle. The warmed gas can thus be fed back passively.

In accordance with one or more embodiments, the return line is fluidically connected to the exhaust gas line via a branch line. The branch line can be formed purely by a branching of the exhaust gas line, without a valve function.

In accordance with one or more embodiments, a method for operating a liquid hydrogen reservoir as described hereinbefore can comprise: opening the return line when a detected temperature value in the BMS is less than a predefined temperature, so that at least a partial stream of the exhaust gas line is fed back into the mixing chamber. The temperature in the BMS can be detected or measured by one or more of: the temperature-controlled valve, a measuring probe of the temperature-controlled valve, and a separate measuring probe/sensor suitable for that purpose, and which is arranged at an air supply line upstream of the mixing chamber and/or in the mixing chamber. Icing in the mixing chamber at low ambient temperatures can thereby be prevented.

In accordance with one or more embodiments, a method for operating such a liquid hydrogen reservoir can comprise closing the return line when a predefined temperature in the BMS is exceeded, so that a partial stream of the exhaust gas line is not fed back into the mixing chamber. Overheating in the mixing chamber can thereby be prevented. The temperature in the BMS can again be detected or measured by one or more of: the temperature-controlled valve, a measuring probe of the temperature-controlled valve, and a separate measuring probe/sensor suitable for that purpose, and which is arranged at an air supply line upstream of the mixing chamber and/or in the mixing chamber.

DRAWING

One or more embodiments will be illustrated by way of example in the drawings and explained in the description hereinbelow.

FIG. 1 illustrates a schematic illustration of a liquid hydrogen reservoir, in accordance with one or more embodiments.

DESCRIPTION

FIG. 1 illustrates, in accordance with one or more embodiments, a liquid hydrogen reservoir and thus, an arrangement for warming the air fed to the boil-off system of a cryostatic container 1. The liquid hydrogen reservoir comprises a cryostatic container 1 operable to hold liquid hydrogen ($H_2$). The hydrogen is in liquid form in the lower region of the cryostatic container 1 and is gaseous in the upper region of the container 1. A discharge line 2 is operable to discharge gaseous hydrogen from the upper region of the cryogenic container 1 and extends to the outside in some portions through a region of the liquid hydrogen reservoir that is under vacuum 22 and through a region of the liquid hydrogen reservoir that contains air 23.

The liquid hydrogen reservoir further comprises a boil-off valve (BOV) 3 in the discharge line 2 for selectively, preferably automatically under the control/regulation of overpressure, opening and closing a flow connection of the discharge line 2 to a BMS. In order to protect the tank, the BOV 3 is usually controlled in response to the pressure in the tank.

The BMS comprises a mixing chamber 5 for mixing the gaseous hydrogen with air, a catalyst 6 arranged downstream of the mixing chamber 5 for the catalytic conversion of the gaseous hydrogen with the air, and an exhaust gas line 7 arranged downstream of the catalyst 6 for discharging the gas stream to the environment.

In accordance with one or more embodiments, a return line 20 fluidically connects the exhaust gas line 7 to the mixing chamber 5, so that a partial stream of the exhaust gas line 7 can be fed back into the mixing chamber 5. The return line 20 is fluidically connected to the exhaust gas line 7 via a branch line 21.

A temperature-controlled valve 8 is arranged in the return line 20, and operable to open and close the return line 20 in response to a detected or measured temperature value. The temperature-controlled valve 8 is operatively connected to a temperature probe/sensor 10, and is operable to open and close in response to a detected temperature value by the temperature probe/sensor 10 at an air supply line 9 arranged upstream of the mixing chamber 5 and/or in the mixing chamber 5. The return line 20 fluidically connects the exhaust gas line 7 to the air supply line 9 upstream of the mixing chamber 5, so that a partial stream of the exhaust gas line 7 can be fed back into the mixing chamber 5 through the air supply line 9. The other partial stream of the exhaust gas line 7 is discharged into the environment through an exhaust gas outlet 25.

The air supply line 9 allows surrounding ambient air to be taken in through an air inlet 24. The ambient air is fed into the mixing chamber 5 and the partial stream of the exhaust gas line 7 is fed into the air supply line 9 and further into the mixing chamber 5 via the Venturi principle by the suction action of the media flowing past in each case, and thus, takes place passively, without electrical components. Thus, via the Venturi principle, a (small) portion of the exhaust gas of the BMS is fed back into the mixing chamber 5 via the air inlet 24 by lateral suction at the air supply line 9. The exhaust gas is branched off in such a manner that the exhaust gas stream is impeded as little as possible (even with the valve closed) and moreover, at the inlet into the branching return line 20, where possible the total hydrodynamic pressure of the exhaust gas is present at the exhaust gas line 7. The temperature-controlled valve 8 blocks the gas stream as soon as the detected temperature value at the air inlet 24 or in the mixing chamber 5 is greater than or otherwise exceed a predefined threshold value.

A portion of the warm exhaust gas of the BMS of a vehicle powered by liquid hydrogen can therefore, at ambient temperatures close to 0° C., be fed back into the mixing chamber 5 of the BMS via Venturi suction, in order to warm the mixing chamber internally and thus, avoid the formation of ice.

LIST OF REFERENCE SYMBOLS

1 cryostatic container
2 discharge line
3 boil-off valve (BOV)
5 mixing chamber
6 catalyst
7 exhaust gas line
8 temperature-controlled valve
9 air supply line
10 temperature probe/sensor
20 return line
21 branch line
22 vacuum
23 air
24 air inlet
25 exhaust gas outlet
H2 hydrogen

What is claimed is:

1. A liquid hydrogen reservoir, comprising:
a cryostatic container operable to hold liquid hydrogen;
a discharge line operable to discharge gaseous hydrogen in the cryostatic container;
a boil-off management system that includes:
a mixing chamber operable to mix the gaseous hydrogen with ambient air,
a catalyst arranged downstream of the mixing chamber and operable for a catalytic conversion of the gaseous hydrogen with the ambient air, and
an exhaust gas line arranged downstream of the catalyst and operable to discharge the gas stream to the environment,
a return line operable to connect the exhaust gas line to the mixing chamber to facilitate a return flow of at least a partial stream of the exhaust gas line into the mixing chamber; and
a boil-off valve, arranged in the discharge line, and operable to selectively open and close a flow connection of the discharge line to the boil-off management system.

2. The liquid hydrogen reservoir of claim 1, further comprising a temperature-controlled valve arranged in the return line and operable to open and close the return line in response to a detected temperature value.

3. The liquid hydrogen reservoir of claim 2, wherein the detected temperature value is at an air supply line upstream of the mixing chamber.

4. The liquid hydrogen reservoir of claim 2, wherein the detected temperature value is in the mixing chamber.

5. The liquid hydrogen reservoir of claim 1, wherein the return line is operable to fluidically connect the exhaust gas line to an air supply line arranged upstream of the mixing chamber, to facilitate the return flow of the partial stream of the exhaust gas line into the mixing chamber through the air supply line.

6. The liquid hydrogen reservoir of claim 1, wherein the ambient air is fed into the mixing chamber via the Venturi principle.

7. The liquid hydrogen reservoir of claim 1, wherein the partial stream of the exhaust gas line is fed into the mixing chamber via the Venturi principle.

8. The liquid hydrogen reservoir of claim 1, wherein:
the ambient air is fed into the mixing chamber via the Venturi principle, and
the partial stream of the exhaust gas line is fed into the mixing chamber via the Venturi principle.

9. The liquid hydrogen reservoir of claim 1, further comprising a branch line to fluidically connect the return line to the exhaust gas line.

10. A method for operating a liquid hydrogen reservoir according to claim 1, the method comprising:
providing a liquid hydrogen reservoir that includes:
a cryostatic container operable to hold liquid hydrogen,
a discharge line operable to discharge gaseous hydrogen in the cryostatic container;
a boil-off management system that includes:
a mixing chamber operable to mix the gaseous hydrogen with ambient air,
a catalyst arranged downstream of the mixing chamber and operable for a catalytic conversion of the gaseous hydrogen with the ambient air, and
an exhaust gas line arranged downstream of the catalyst and operable to discharge the gas stream to the environment,
a return line operable to connect the exhaust gas line to the mixing chamber to facilitate a return flow of at least a partial stream of the exhaust gas line into the mixing chamber; and
a boil-off valve, arranged in the discharge line, and operable to selectively open and close a flow connection of the discharge line to the boil-off management system;
facilitating a return flow of at least a partial stream of the exhaust gas line into the mixing chamber by opening the return line when a detected temperature value in the boil-off management system is less than a predefined temperature value.

11. The method of claim 10, further comprising preventing the return flow of at least a partial stream of the exhaust gas line into the mixing chamber by closing the return line when the detected temperature value in the boil-off management system is greater than the predefined temperature value.

12. A liquid hydrogen reservoir, comprising:
a cryostatic container operable to hold liquid hydrogen;
a discharge line operable to discharge gaseous hydrogen in the cryostatic container;
a boil-off management system that includes:
a mixing chamber operable to mix the gaseous hydrogen with ambient air,
an exhaust gas line arranged downstream of the mixing chamber and operable to discharge the gas stream to the environment,
a return line operable to connect the exhaust gas line to the mixing chamber to facilitate a return flow of at least a partial stream of the exhaust gas line into the mixing chamber;
a boil-off valve, arranged in the discharge line for selectively opening and closing a flow connection of the discharge line to the boil-off management system;
a temperature sensor operable to detect a temperature value in the boil-off management system; and a temperature-controlled valve arranged in the return line and operable to open and close the return line in response to the detected temperature value.

13. The liquid hydrogen reservoir of claim 12, wherein the boil-off management system further includes a catalyst arranged downstream of the mixing chamber and is operable for a catalytic conversion of the gaseous hydrogen with the ambient air.

14. The liquid hydrogen reservoir of claim 12, wherein the detected temperature value is at an air supply line upstream of the mixing chamber.

15. The liquid hydrogen reservoir of claim 12, wherein the detected temperature value is in the mixing chamber.

16. The liquid hydrogen reservoir of claim 12, wherein the return line fluidically is operable to fluidically connect the exhaust gas line to an air supply line arranged upstream of the mixing chamber, to facilitate the return flow of the partial stream of the exhaust gas line into the mixing chamber through the air supply line.

17. The liquid hydrogen reservoir of claim 12, wherein the ambient air is fed into the mixing chamber via the Venturi principle.

18. The liquid hydrogen reservoir of claim 12, wherein the partial stream of the exhaust gas line is fed into the mixing chamber via the Venturi principle.

19. The liquid hydrogen reservoir of claim 12, wherein:

the ambient air is fed into the mixing chamber via the Venturi principle, and the partial stream of the exhaust gas line is fed into the mixing chamber via the Venturi principle.

20. The liquid hydrogen reservoir of claim 12, further comprising a branch line to fluidically connect the return line to the exhaust gas line.

* * * * *